US007734139B2

(12) United States Patent
Rector, III

(10) Patent No.: US 7,734,139 B2
(45) Date of Patent: Jun. 8, 2010

(54) MODULAR CABLE-MANAGEMENT SYSTEM

(75) Inventor: Jack Brown Rector, III, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/246,916

(22) Filed: Oct. 7, 2008

(65) Prior Publication Data
US 2010/0086273 A1    Apr. 8, 2010

(51) Int. Cl.
*G02B 6/00* (2006.01)
(52) U.S. Cl. .................. 385/136; 385/134; 385/135; 385/137; 174/95; 174/97
(58) Field of Classification Search ......... 385/136–137; 174/97
See application file for complete search history.

(56) References Cited

U.S. PATENT DOCUMENTS

| | | | | |
|---|---|---|---|---|
| 5,515,472 | A * | 5/1996 | Mullaney et al. | 385/135 |
| 6,009,223 | A * | 12/1999 | Arizpe | 385/134 |
| 6,170,784 | B1 * | 1/2001 | MacDonald et al. | 248/65 |
| 6,378,811 | B1 | 4/2002 | Potter et al. | |
| 6,427,952 | B2 | 8/2002 | Caveney et al. | |
| 6,501,899 | B1 * | 12/2002 | Marrs et al. | 385/135 |
| 6,539,161 | B2 * | 3/2003 | Holman et al. | 385/136 |
| 6,553,172 | B2 * | 4/2003 | Lortie et al. | 385/134 |
| 6,584,267 | B1 * | 6/2003 | Caveney et al. | 385/134 |
| 6,586,680 | B1 | 7/2003 | Nelson | |
| 6,614,665 | B2 * | 9/2003 | Witty et al. | 361/826 |
| 6,614,981 | B2 * | 9/2003 | Zdinak et al. | 385/136 |
| 6,658,193 | B1 * | 12/2003 | Ati et al. | 385/136 |
| 6,665,484 | B2 * | 12/2003 | Douglas et al. | 385/136 |
| 6,671,447 | B1 * | 12/2003 | Gehrke | 385/135 |
| 6,768,858 | B2 * | 7/2004 | Tinucci et al. | 385/134 |
| 6,771,871 | B2 * | 8/2004 | Krampotich et al. | 385/134 |
| 6,785,459 | B2 * | 8/2004 | Schmidt et al. | 385/134 |
| 6,884,942 | B2 | 4/2005 | McGrath et al. | |
| 6,892,020 | B2 * | 5/2005 | Douglas et al. | 385/136 |
| 6,947,654 | B2 * | 9/2005 | Krampotich et al. | 385/134 |
| 7,000,784 | B2 * | 2/2006 | Canty et al. | 211/26 |
| 7,119,280 | B1 * | 10/2006 | Ray et al. | 174/72 A |
| 7,178,679 | B2 | 2/2007 | Canty et al. | |
| 7,228,048 | B1 * | 6/2007 | Dunfee et al. | 385/136 |
| 7,319,804 | B2 * | 1/2008 | Hruby et al. | 385/136 |
| 7,418,186 | B1 * | 8/2008 | Grubish et al. | 385/137 |

OTHER PUBLICATIONS

Product Data Sheets for MCS—EFX Master Cabling Section Extended Fingers, © 2004 Chatsworth Products, Inc., Mar. 2004.
Product Data Sheets for Cable Management, © 2007 Chatsworth Products, Inc., Mar. 2007.
Product Data Sheets for Cable Management, © 2007 Chatsworth Products, Inc., Sep. 2007.
Product Data Sheet for NetFrame® Cable Management Rack System, Part No. NFBRF, © 1995-2008, Panduit Corp. (downloaded via the Internet on Feb. 8, 2008).
Netframe Bend Radius Fingers (NFBRF) Customer Drawing, Panduit Corp., Tinley Park, Illinois, Oct. 20, 2004 (downloaded via the Internet on Feb. 8, 2008).

* cited by examiner

*Primary Examiner*—Ryan Lepisto

(57) ABSTRACT

Apparatus for providing cable-management comprising at least one bracket having a support member and a plurality of extensions protruding from the support member, where at least one pair of adjacent extensions define at least one receptacle. At least one cable holder is removably inserted into the at least one receptacle.

20 Claims, 5 Drawing Sheets

MODULAR CABLE-MANAGEMENT SYSTEM

FIELD OF THE INVENTION

The present invention generally relates to a cable management system, and more particularly, to a modular cable-management system for rack mounted electronic equipment.

BACKGROUND

Telecommunications systems commonly include cables for interconnecting pieces of telecommunications equipment. Equipment racks typically hold a variety of different pieces of telecommunications equipment in a relatively small area. In some instances, thousands of cables are used to interconnect the various pieces of equipment mounted in the racks. As such, cable management is important for efficiently routing cables to minimize the space occupied by the cables, preventing damage or unexpected displacement of the cables, and avoiding excessive cable bending or other external forces that may damage a cable or its associated connector or connectors.

In general, cable management improvement has been sought, generally to efficiently and effectively manage cables by providing system adaptability, and ease of cable organization.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF EXAMPLE EMBODIMENTS

Overview

As embodied and broadly described herein, embodiments of the present invention comprise a cable-management system with modular cable holders that provide efficient and effective cable management.

Embodiments of the present invention comprise an apparatus for providing cable-management having at least one bracket comprising a support member and a plurality of extensions protruding from the support member, where at least one pair of adjacent extensions define at least one receptacle. At least one cable holder is removably inserted into the at least one receptacle.

DETAILED DESCRIPTION

Figure 1:
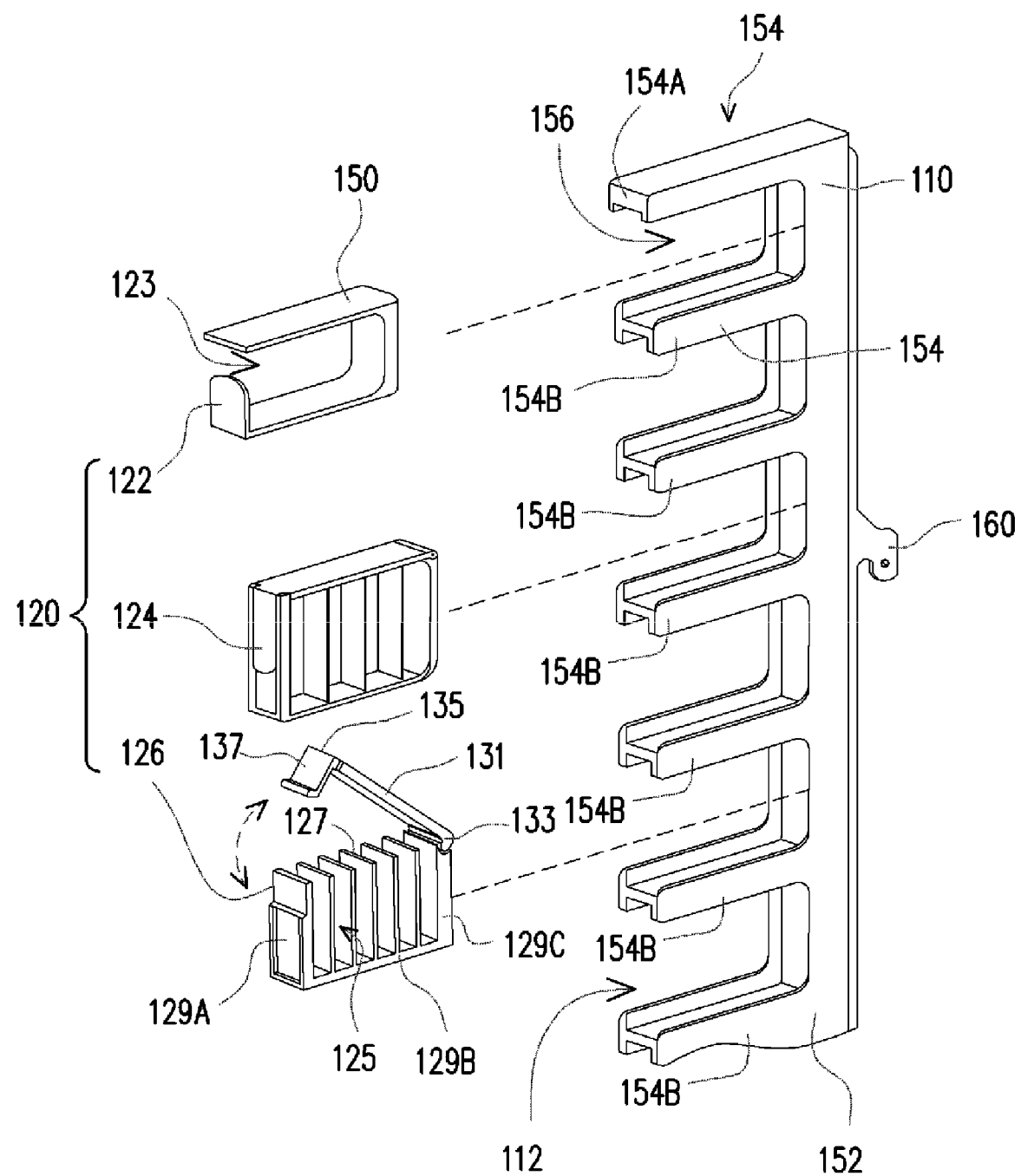
FIG. 1 is a perspective view of a modular cable-management system in accordance with one embodiment of the present invention.

FIG. 1 is a perspective view of an apparatus for providing modular cable-management in accordance with embodiments of the present invention. The apparatus is embodied in a modular cable-management system 100 comprising at least one bracket 110 and at least one cable holder 120, which removably mounts in the bracket 110. The bracket 110 is adapted to be mounted to an equipment rack (not shown) using a protruding hook 160. The hook 160 is designed to be inserted within a rectangular slot in the equipment rack. Other attachment techniques may also be used, such as, adhesive, screws, rivets, bolt/nuts, and the like. The bracket 110 comprises a main support member 152 having a plurality of extensions 154 that protrude at a substantially right angle from the member support 152. Each extension 154 is slotted to retain a cable holder 120 between any two extensions 154. A pair of adjacent extensions 154 forms a receptacle 156 for receiving the cable holder 120. More specifically, the top most extension 154A (and the bottom most extension (not shown)) have a slot formed in one surface of the extension, bottom surface in the top most extension and top surface in the bottom most extension. The other extensions 154B have slots in both the top and bottom surfaces. The bracket 110 and one or more cable holders 120 may be provided as a cable-management kit. In one embodiment, the cable holders and bracket are fabricated of plastic.

As shown in FIG. 1, the cable holder 120 is available in a variety of types, such as, for example, TYPE-1 cable holder 122, TYPE-2 cable holder 124, and TYPE-3 cable holder 126. Each type of cable holder 120 provides support or organization for a different type of cable. The different types of cables available on the market include, for example, category 3 cables, category 5 cables, category 6a cables, category 7 cables, fiber optic cables, or combinations thereof. The cable holders 122, 124, and 126 are adapted to be removably mounted in the receptacles 112 on the bracket 110 and accommodate cables.

Specifically, the TYPE-1 cable holder 122 comprises a rectangular frame 150 having an opening 123 that is adopted for generic use to accommodate various types of cables together in a cable bundle.

The comb-like shaped cable holder 124 or 126 comprises a three sided frame 129A, 129B, 129C, a top 131, and a plurality of fins 127 that functions as separators. The top 131 pivots at location 133 where the top 131 joins the frame 129C e.g., the location 133 forms a hinge. The distal end 135 of the top 131 comprises a flange 137 that overlaps the frame 129A. The flange 137 may form a clasp to maintain the top in a "closed" position over the fins 127. The fins 127 define a plurality of passageways 125 for accommodating cables, and the width of the passageway 125 is defined by the pitch of the fins 127 of the comb structure. In one embodiment, each passageway 125 can accommodate a vertical stack of 4 Category 5 cables. As illustrated in FIG. 1, the pitch of the fins 127 of the TYPE-2 cable holder 124 is different from that of the TYPE-3 cable holder 126, so as to facilitate effective management and ease of organization of various cable sizes, wire gages and shapes. Although three types of cable holders are shown, those skilled in the art may conceive of any number of configurations of the cable holders. Any such configuration is considered to be within the scope of the present invention. Hereinafter, other embodiments are described to illustrate practical application of the modular cable-management system of the present invention, wherein flexibility and advantages of the modular cable-management system with use of a variety of types of the cable holders for accommodating different cables are presented. However, the aforementioned cable holders applied in the following embodiments are only exemplary and not intended to limit the scope of the present invention.

The spacing between extensions 154 of the bracket 110 is generally defined to position the cable holders 120 proximate the cable interfaces of each electronic apparatus in an equipment rack. Such arrangements are discussed in detail with respect to FIGS. 2, 3 and 4 below.

Figure 2:
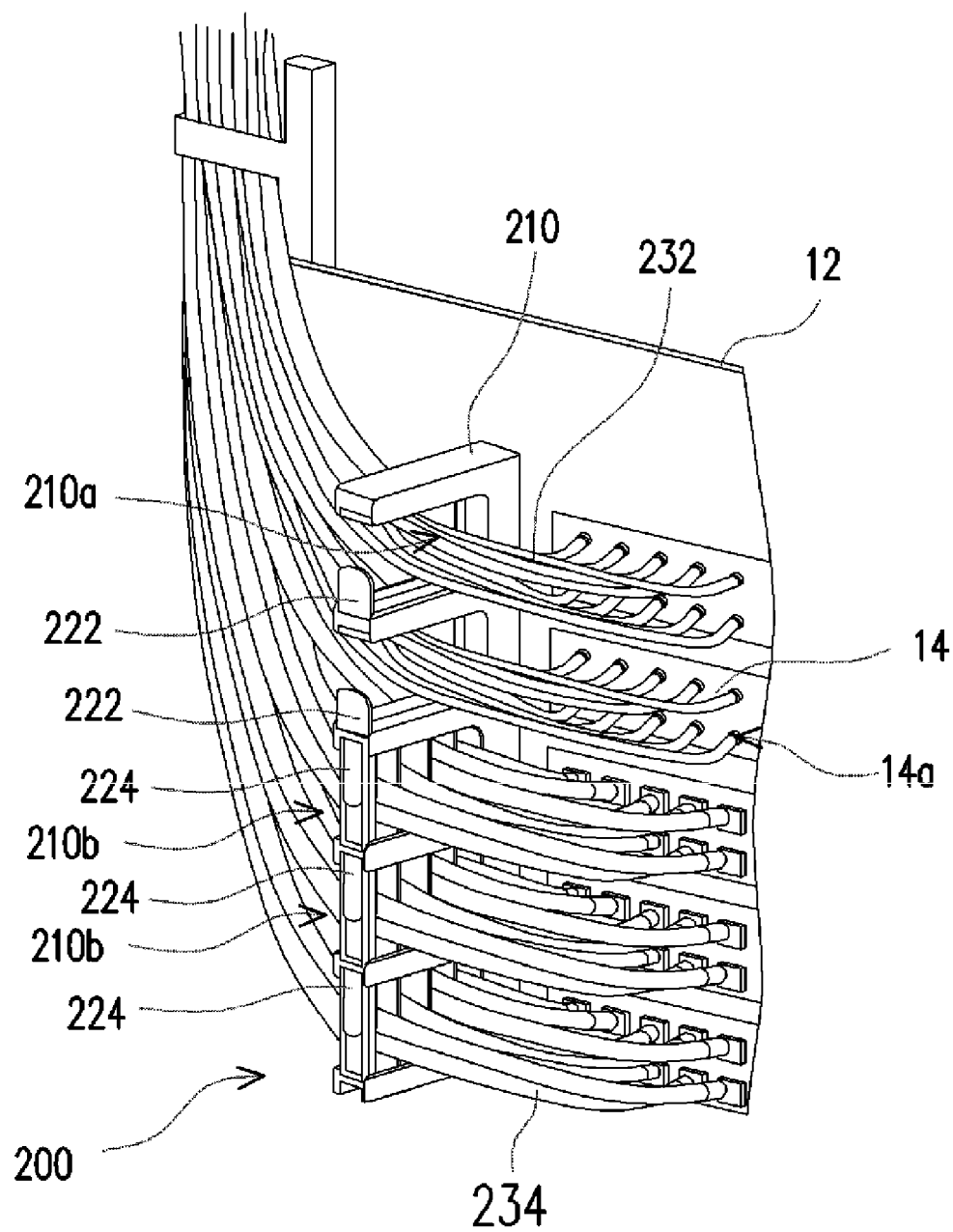
FIG. 2 is a perspective view of an example electronic system that employs a modular cable-management system in accordance with an embodiment of the present invention.

FIG. 2 is a perspective view of an example electronic system 10 that employs a modular cable-management system 200 in accordance with an embodiment of the present invention. The electronic system 10 includes an equipment mounting rack 12 and electronic apparatus 14, such as linecards, disposed within the rack 12. The modular cable-management system 200 comprises a bracket 210, a plurality of first cable holders 222, and a plurality of second cable holders 224. The bracket 210 is mounted to the mounting rack 12 and comprises a plurality of first receptacles 210a and a plurality of second receptacles 210b. The first cable holders 222 are removably mounted within the first receptacles 210a and accommodate a first type of cables 232, while the second cable holders 224 are removably mounted within the second receptacles 210b and accommodate a second type of cables 234.

The bracket 210 is mounted to the mounting rack 12 at a location that aligns the first receptacles 210a and the second receptacles 210b proximate to interfaces 14a of their corresponding electronic apparatus 14 to facilitate coupling with the first type of cables 232 and the second type of cables 234, respectively. In the present embodiment, it is noted that each of the first cable holders 222 or second cable holders 224 are used to accommodate cables from different electronic apparatus 14. However, in other embodiments, some of the first cable holders 222 or second cable holders 224 may be used to accommodate cables from an identical electronic apparatus according to cabling requirements.

In the present embodiment, the first cable holders 222 and the second cable holders 224 are used to respectively provide support or organize different types of first and second cables 232 and 234, and to facilitate coupling to the corresponding interfaces 14a (e.g., electrical or optical connectors). Examples of first and second cables 232 and 234 include, for example but not limited to, category 3 cables, category 5 cables, category 6a cables, category 7 cables, fiber optic cables, or the combinations thereof. Furthermore, the first and second receptacles 210a and 210b and the first and second cable holders 222 and 224 provide strain relief for the first and second cables 232 and 234.

In the present embodiment, the first cable holders 222 are exemplified as the TYPE-1 cable holder, while the second cable holders 224 are exemplified as the TYPE-2 cable holder. However, in other embodiments, other types of cable holders, such as the TYPE-3 cable holders may also be applied to the bracket 210 according to the cabling requirements.

Figure 3:
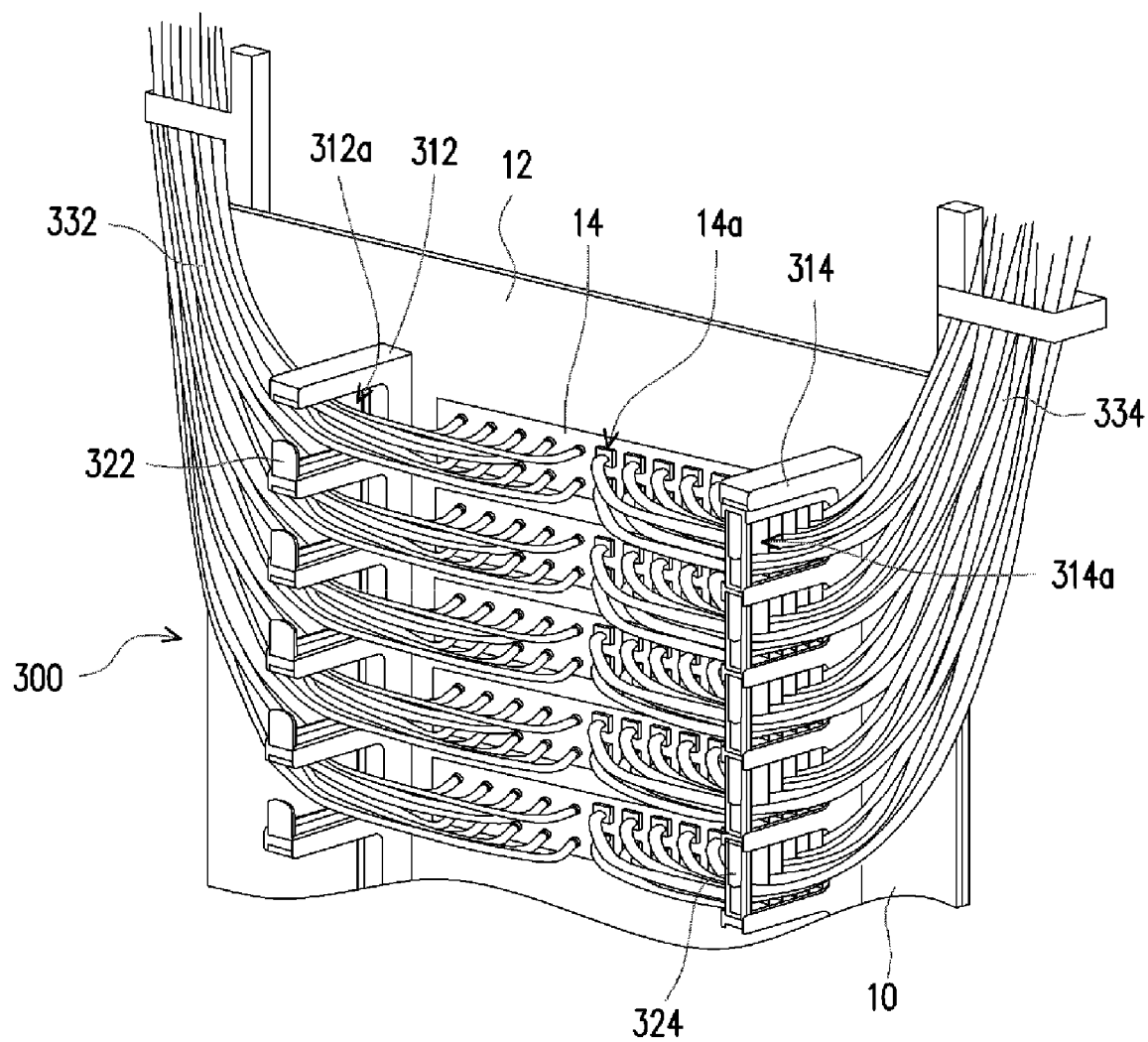
FIG. 3 is a perspective view of an example electronic system that employs a modular cable-management system in accordance with another embodiment of the present invention.

FIG. 3 is a perspective view of an example electronic system that employs a modular cable-management system in accordance with another embodiment of the present invention. The electronic system 10 includes a mounting rack 12 and electronic apparatuses 14 disposed within the mounting rack 12. The modular cable-management system 300 comprises a first bracket 312, a second bracket 314, a plurality of first cable holders 322, and a plurality of second cable holders 324. The first bracket 312 and the second bracket 314 are attached to the mounting rack 12, wherein the first bracket 312 comprises a plurality of first receptacles 312a and the second bracket 314 comprises a plurality of second receptacles 314a. The first cable holders 322 are removably mounted in the first receptacles 312a and accommodate a first type of cables 332, while the second cable holders 324 are removably mounted to the second receptacles 314a and accommodate a second type of cables 334.

The first bracket 312 and the second bracket 314 are located and mounted to the mounting rack 12 so as to align the first receptacles 312a and the second receptacles 314a proximate to interfaces 14a of their corresponding electronic apparatus 14 to facilitate coupling of the first type of cables 332 and the second type of cables 334 to their corresponding electronic apparatus 14, respectively. In the present embodiment, it is noted that some of the first cable holders 322 or the second cable holders 324 are used for accommodating cables from different electronic apparatuses 14, and some others are used to accommodate cables from an identical electronic apparatus 14.

In the present embodiment, the first bracket 312 and the second bracket 314 are mounted with different types of first and second cable holders 322 and 324, respectively. The first cable holders 322 mounted on the first bracket 312 and the second cable holders 324 mounted on the second bracket 314 are used to provide support or organize different types of cables 332 and 334, and to facilitate coupling of the first and second cables 332 and 334 to the corresponding interfaces 14a. Examples of the first and second cables 332 and 334 include category 3 cables, category 5 cables, category 6a cables, category 7 cables, fiber optic cables, or the combinations thereof. Furthermore, the first and second receptacles 312a and 314a and the first and second cable holders 322 and 324 may be adapted to provide strain relief for the first and second cables 332 and 334.

In the present embodiment, each of the first cable holders 322 is exemplified as the TYPE-1 cable holder, while each of the second cable holders 324 is exemplified as the TYPE-3 cable holder. However, in other embodiments, other types of cable holders, such as the TYPE-2 cable holders may also be applied on the first bracket 312 or the second bracket 314 according to the specific need.

The above embodiments illustrate using one type of cable holder to accommodate only one type of cables. However, it would be understood that the above description is for merely illustrating example embodiments of the present invention, and they are not intended to limit the scope of the present invention. One skilled in the art would understand that one type of cable holder may be used to accommodate one or more types of cables. Additionally, the cable holders of various types can be mixed and matched on each bracket. Any combination of cable holder types is considered within the scope of invention.

Figure 4:
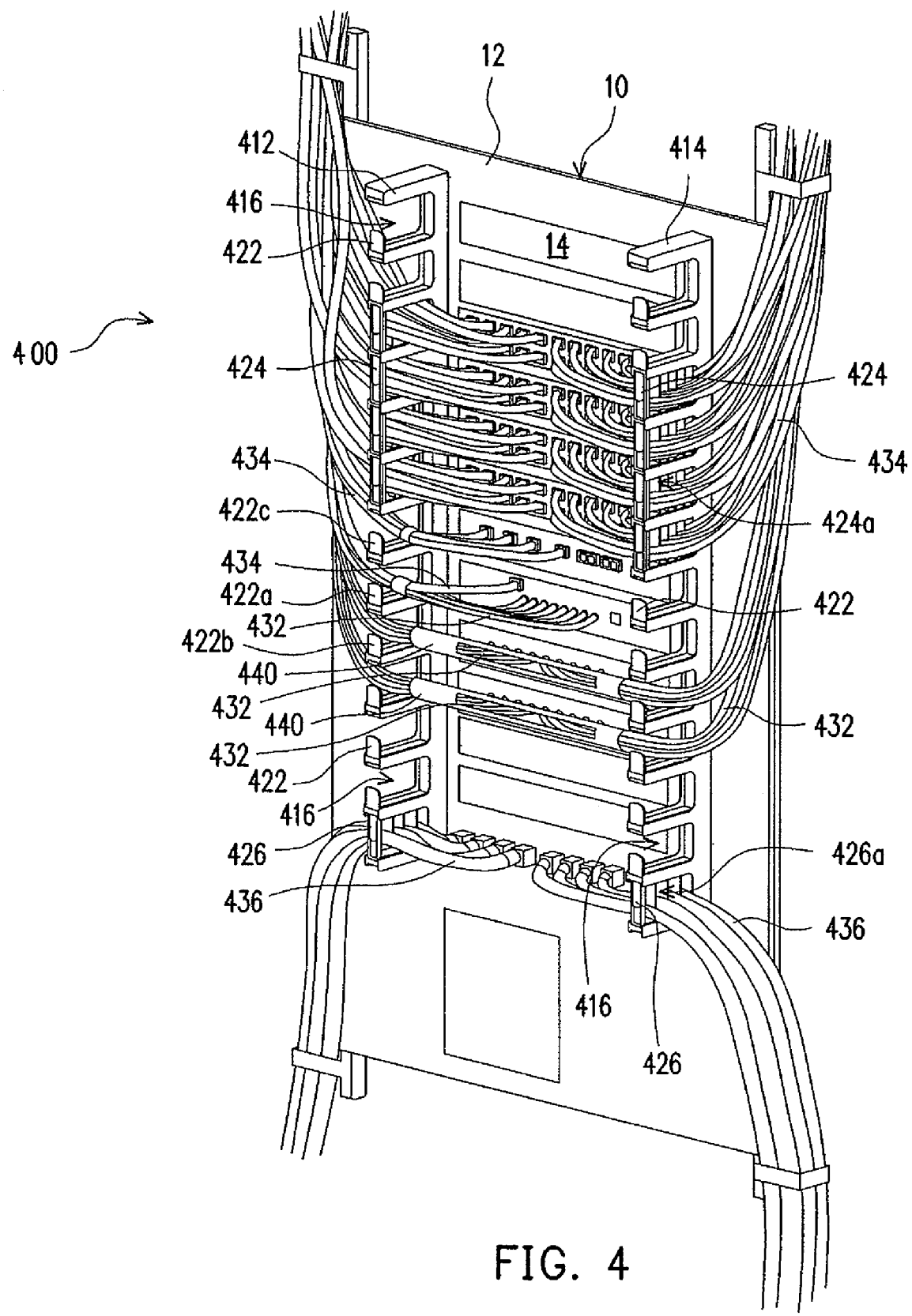
FIG. 4 is a perspective view of an example electronic system that employs a modular cable-management system in accordance with yet another embodiment of the present invention.

FIG. 4 is a perspective view of an example electronic system that employs a modular cable-management system in accordance with yet another embodiment of the present invention. The present embodiment applies the TYPE-1, TYPE-2, and TYPE-3 cable holders for accommodating three different types of cables. Various combinations of the arrangement of the cable holders and the cables are presented herein exemplarily. Contents of the above embodiments can be incorporated into the present embodiment, while the illustrations of the similar parts are not repeated again.

The electronic system 10 includes an equipment mounting rack 12 and a plurality of electronic apparatus 14 disposed within the rack 12. The modular cable-management system 400 comprises a first bracket 412, a second bracket 414, and a cable holder (e.g., a plurality of TYPE-1 cable holders 422, a plurality of TYPE-3 cable holders 424, and/or a plurality of TYPE-2 cable holders 426. The first bracket 412 and the second bracket 414 are attached to the mounting rack 12, wherein each of the first bracket 412 and the second bracket 414 comprise receptacles 416, wherein the TYPE-1 cable holders 422, the TYPE-2 cable holder 424, and the TYPE-3 cable holder 426 are removably inserted into the receptacles 416, respectively. Furthermore, the arrangement of the cable holders on the first bracket 412 and the second bracket 414 are symmetrical.

In the present embodiment, each of the TYPE-1 cable holders 422 may be selected to accommodate different types of cables or an identical type of cables. Specifically, the TYPE-1 cable holder 422a mounted to the first bracket 412 accommodates both a first type of cables 432 and a second type of cables 434, the TYPE-1 cable holder 422b mounted to the first bracket 412 accommodates only the first type of cables 432, and the TYPE-1 cable holder 422c mounted to the first bracket 412 accommodates only the second type of cables 434.

Furthermore, the first type of cables 432 or the second type of cables 434 accommodated by each TYPE-1 cable holder 422 may come from different interfaces 14a of different electronic apparatuses 14, different interfaces 14a of an identical electronic apparatus 14, or an identical interface 14a of an identical electronic apparatus 14. Furthermore, the first type of cables 432 or second type of cables 434 accommodated by different TYPE-1 cable holders 422 may come from different interfaces 14a of different electronic apparatus 14, different interfaces 14a of an identical electronic apparatus 14, or an identical interface 14a of an identical electronic apparatus 14.

In addition, each of the TYPE-3 cable holders 424 accommodates the second type of cables 434. The TYPE-3 cable holders 424 are configured into comb-like shape comprising a plurality of passageways 424a for accommodating the second type of cables 434. The second type of cables 434 from the same apparatus 14 are divided into two bundles and accommodated by the symmetric TYPE-3 cable holders 424 on the first bracket 412 and the second bracket 414, respectively.

Moreover, each of the TYPE-2 cable holders 426 accommodates the third type of cables 436. The TYPE-2 cable holders 426 are configured into comb-like shape comprising a plurality of passageways 426a, wherein the passageways 426a are larger than the passageways 424a of the TYPE-3 cable holders 424 for accommodating the third type of cables 436 with larger diameter than that of the second type of cables 434. Similarly, the third type of cables 436 from the same apparatus 14 are divided into two bundles and accommodated by the symmetric TYPE-2 cable holders 426 on the first bracket 412 and the second bracket 414, respectively. The first bracket 412, the second bracket 414, the TYPE-1, TYPE-2 and TYPE-3 cable holders and may be provided as a kit.

In order to provide more stress or strain relief and bend radius limitation on cables, cable trays 440 may be mounted to the corresponding receptacles 416 of the first bracket 412 and the second bracket 414. A detailed view of a cable tray is described with respect to FIG. 5. The trays 40 may be provided as a portion of a cable management kit. Alternatively, the first bracket 412, the second bracket 414, the TYPE-1, TYPE-2 and TYPE-3 cable holders and may be provided as a cable management kit that may be provided and installed separately from the equipment rack.

Figure 5:
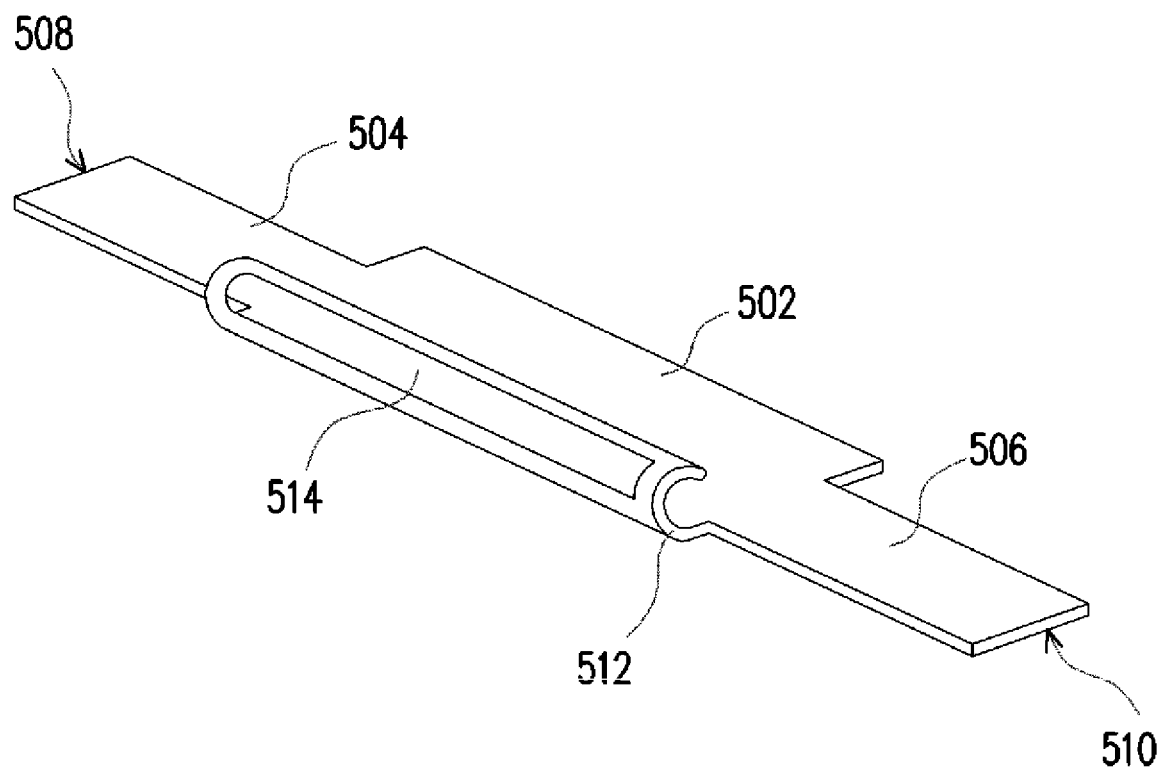
FIG. 5 is a perspective view of one embodiment of a cable tray that may be used within a modular cable-management system.

FIG. 5 is a perspective view of a cable tray 500 that is sized to be supported by a pair of extensions 154 (and/or inserted holders 120). The cable tray 500 comprises a central rectangular portion 502 and a pair of ears 504 and 506 extending from the ends of the portion 502. When installed, the ears 504 and 506 rest upon the extensions 154 of a pair of brackets 110 (and/or inserted holders 120) at points 508 and 510. In one embodiment, the long edge of the central rectangular portion 502 is "turned up" to form an arcuate portion 512. The arcuate portion 512 forms a cable barrier that controls the bend radius of the cables in the tray 502 (see FIG. 4). The slot (opening) 514 is optional. However, when present the slot 514 provides an ability to manipulate the cables lying on the tray and to enable easy viewing of cable routing. Although an arcuate portion 512 is shown, the tray 500 may use a vertical portion as a cable barrier that extends upward at substantially a right angle with respect to the rectangular portion 502. Any form of barrier that facilitates bend radius control may be used.

However, it should be noted that the aforementioned tray is not limited to be used for supporting or for providing stress or strain relief to specific types of cables, and can further be properly applied to other arrangements, such as the aforementioned embodiments or other embodiments of the present invention, according to practical demands. Furthermore, each tray and its corresponding cable holders and brackets can be provided as a portion of a cable management kit.

Furthermore, although not shown in FIGS. 1-4, each of the receptacles 112, 156, 210a, 210b, 312a, 314a and 416 and/or cable holders 120, 122, 124, 126, 222, 224, 322, 324, 422, 422a, 422b, 422c, 424 and 426 may include details (e.g., detents) for preventing inadvertent or undesired removal of the cable holders 120, 122, 124, 126, 222, 224, 322, 324, 422, 422a, 422b, 422c, 424 and 426 from the receptacles 112, 156, 210a, 210b, 312a, 314a and 416.

Moreover, although each of the receptacles 112, 156, 210a, 210b, 312a, 314a and 416 and/or cable holders 120, 122, 124, 126, 222, 224, 322, 324, 422, 422a, 422b, 422c, 424 and 426 (and in turn, the brackets) may be configured such that they are aligned proximate to the respective interfaces of the electronic apparatuses (collectively "interfaces") 14a, as shown in FIGS. 2-4, the receptacles 112, 156, 210a, 210b, 312a, 314a and 416 (and, in turn the cable holders 120, 122, 124, 126, 222, 224, 322, 324, 422, 422a, 422b, 422c, 424 and 426) may be configured (e.g., dimensioned and/or positioned) such that (i) the receptacles 112, 156, 210a, 210b, 312a, 314a and 416 (and, in turn the cable holders 120, 122, 124, 126, 222, 224, 322, 324, 422, 422a, 422b, 422c, 424 and 426) are larger or smaller than and/or aligned remotely to the respective interfaces 14a. An advantage of aligning the receptacles 112, 156, 210a, 210b, 312a, 314a and 416 and/or cable holders 120, 122, 124, 126, 222, 224, 322, 324, 422, 422a, 422b, 422c, 424 and 426 proximate to the respective interfaces 14a is that such alignment may prevent cables coupled to one the respective interfaces 14a from occluding or otherwise interfering access to those adjacent to such interface.

Although plural embodiments have been proposed herein to illustrate the arrangement and combinations of the bracket, the cable holders and the accommodated cables, the present invention is not limited thereto. It will be apparent to those skilled in the art that various modifications and variations can be made to the structure of the present invention, such as the deposition, profile or number of the cable holders and the brackets, and the arrangement of cables, without departing from the scope or spirit of the invention.

The modular cable-management system comprises modular cable holders to organize and support different types of cables depending on the rack configuration and cabling requirements. This system works well to manage and organize the span of cables from the rack face/port opening to where they enter the customer cable management solution. The modular nature of this system allows specific cable management functionality to support any cable type or configuration. Furthermore, this solution helps maintain apparatus to apparatus clearance for access to ejectors and display visibility.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

I claim:

1. An apparatus for providing cable-management comprising:
   at least one bracket comprising a support member and a plurality of extensions protruding from the support member, each of said extensions defining a slot having a width, where opposing slots of at least one pair of adjacent extensions define at least one receptacle; and
   at least one cable holder removably inserted into the at least one receptacle defined by the opposing slots, the at least one cable holder having a width less than the widths of the opposing slots, wherein the at least one cable holder comprises a frame defining an opening through which a cable may be routed, fins located in the opening to divide the opening into a plurality of passageways, and a top that is hinged to facilitate access to the opening.

2. The apparatus of claim 1, wherein at least one extension comprises a slot on a top surface and a slot on a bottom surface.

3. The apparatus of claim 1, wherein a spacing between fins accommodates a particular cable size.

4. The apparatus of claim 3, wherein the at least one cable holder comprises a first plurality of cable holders having openings with fins and a second plurality of cable holders having openings without fins.

5. The apparatus of claim 4, wherein the first plurality of cable holders having openings with fins includes a first cable holder having fins spaced a first distance and a second cable holder having fins spaced a second distance different than the first distance.

6. The apparatus of claim 1, wherein the frame comprises a frame opening to facilitate access to the opening defined by the frame for holding a cable.

7. The apparatus of claim 1, wherein the at least one bracket and the at least one cable holder are provided as a cable management kit.

8. The apparatus of claim 1, wherein the at least one bracket comprises a mounting element for attaching the at least one bracket to an equipment rack.

9. The apparatus of claim 8, wherein the mounting element is positioned to facilitate attaching the at least one bracket to the equipment rack to position the cable holder proximate an interface of electronic equipment within the equipment rack.

10. The apparatus of claim 1, wherein the at least one cable holder comprises a plurality of cable holders, where the cable holders in the plurality of cable holders accommodate routing of various types of cables.

11. An apparatus for providing cable management comprising:
    a first bracket comprising a first support member and a plurality of first extensions protruding from the first support member, each of the first extensions defining a slot having a width, where opposing slots of at least one pair of adjacent first extensions define at least one first receptacle;
    a second bracket comprising a second support member and a plurality of second extensions protruding from the second support member, each of the second extensions defining a slot having a width, where opposing slots of at least one pair of adjacent second extensions define at least one second receptacle; and
    a cable tray positioned between a first receptacle and a second receptacle, the cable tray including a central portion having first and second opposite ends, a first ear extending outwardly from the first end, and a second ear extending outwardly from the second end, the first ear engaging and removably supported by the first receptacle and the second ear engaging and removably, supported by the second receptacle; and
    at least one cable holder configured to be removably inserted into the at least one first or second receptacle defined by the opposing slots, and the at least one cable holder having a width less than the widths of the opposing slots.

12. The apparatus of claim 11, wherein the cable tray further comprises a cable barrier positioned along an edge of the central portion.

13. The apparatus of claim 12, wherein the cable barrier comprises an aperture.

14. The apparatus of claim 11, wherein the at least one cable holder comprises a plurality of cable holders to accommodate routing of various types of cables.

15. The apparatus of claim 11, wherein the mounting element is positioned on the first and second brackets in a location that positions the at least one cable holder proximate an interface of equipment mounted in the equipment rack.

16. The apparatus of claim 11, wherein each of the first and second brackets comprise a mounting element for attaching the first and second brackets to an equipment rack.

17. An apparatus for providing cable-management comprising:
    at least one bracket comprising a support member and a plurality of extensions protruding from the support member, each of said extensions defining a slot having a width, where opposing slots of at least one pair of adjacent extensions define at least one receptacle; and
    at least one cable holder removably inserted into the at least one receptacle defined by the opposing slots, the at least one cable holder having a width less than the widths of the opposing slots, wherein the at least one cable holder comprises a frame defining an opening through which a cable may be routed, and wherein the at least one cable holder comprises:
       a first plurality of cable holders, each of the first plurality of cable holders having fins located in the opening to divide the opening into a plurality of passageways, wherein a spacing between the fins accommodates a particular cable size, and
       a second plurality of cable holders having openings without fins.

18. The apparatus of claim 17, wherein at least one extension comprises a slot on a top surface and a slot on a bottom surface.

19. The apparatus of 17, wherein the at least one bracket comprises a mounting element configured to attach the at least one bracket to an equipment rack.

20. The apparatus of claim 19, wherein the mounting element is configured to facilitate attaching the at least one bracket to the equipment rack to position the cable holder proximate an interface of electronic equipment within the equipment rack.

* * * * *